(12) United States Patent
Bodie et al.

(10) Patent No.: US 8,911,182 B2
(45) Date of Patent: Dec. 16, 2014

(54) AGRICULTURAL EQUIPMENT DRIVE SYSTEM

(75) Inventors: Cameron Bodie, Moose Jaw (CA);
Donald Grant Vass, Regina (CA);
Jonathan Robert Carteri, Regina (CA)

(73) Assignee: Brandt Industries Ltd., Regina, Saskatchewan (CA)

( * ) Notice: Subject to any disclaimer, the term of this patent is extended or adjusted under 35 U.S.C. 154(b) by 966 days.

(21) Appl. No.: 12/789,609

(22) Filed: May 28, 2010

(65) Prior Publication Data

US 2011/0290621 A1 Dec. 1, 2011

(51) Int. Cl.
*B65G 53/08* (2006.01)
*A01D 69/06* (2006.01)
*A01F 12/46* (2006.01)

(52) U.S. Cl.
CPC ............... *A01D 69/06* (2013.01); *A01F 12/46* (2013.01)
USPC .............................. 406/55; 198/601; 198/674

(58) Field of Classification Search
USPC ............................ 406/55; 198/601, 674, 675
See application file for complete search history.

(56) References Cited

U.S. PATENT DOCUMENTS

| | | | | |
|---|---|---|---|---|
| 3,568,819 A * | 3/1971 | Mann | ............................ | 198/536 |
| 4,221,287 A * | 9/1980 | Seragnoli | ..................... | 198/418 |
| 4,285,434 A * | 8/1981 | Schuricht | ..................... | 209/625 |
| 4,526,265 A * | 7/1985 | Enns | ............................... | 198/318 |
| 5,094,334 A * | 3/1992 | Bobrowski | .................... | 198/314 |
| 5,184,715 A | 2/1993 | Feterl | | |
| 5,191,966 A * | 3/1993 | Miller et al. | .................. | 198/493 |
| 5,214,973 A * | 6/1993 | Hambric | .......................... | 476/69 |
| 5,321,938 A * | 6/1994 | LeBlanc | ............................. | 56/6 |
| 5,333,516 A * | 8/1994 | Edwards et al. | .......... | 74/665 GC |
| 5,494,466 A * | 2/1996 | Vernea | ............................. | 440/75 |
| 5,655,872 A * | 8/1997 | Plotkin | ......................... | 414/526 |
| 5,660,077 A * | 8/1997 | Nekola | .......................... | 74/416 |
| 5,722,222 A * | 3/1998 | Walters et al. | ...................... | 56/6 |
| 6,042,326 A * | 3/2000 | Thomas et al. | ............... | 414/502 |
| 6,058,690 A * | 5/2000 | Rutt et al. | .................... | 56/327.1 |
| 6,109,553 A | 8/2000 | Hruska | | |
| 6,375,104 B1 | 4/2002 | Hruska | | |
| 6,516,542 B2 * | 2/2003 | McClure | ...................... | 37/142.5 |
| 6,705,067 B2 * | 3/2004 | Schroeder et al. | ............. | 56/14.6 |
| 6,998,006 B1 * | 2/2006 | Kessler et al. | ................ | 156/230 |
| 7,025,555 B2 | 4/2006 | Hanig | | |
| 7,043,891 B2 * | 5/2006 | Rickert et al. | ................... | 56/119 |
| 7,093,707 B2 | 8/2006 | Matousek et al. | | |
| 7,219,487 B2 * | 5/2007 | Ameye | ........................ | 56/10.2 H |
| 7,478,722 B2 * | 1/2009 | Gartner | .......................... | 198/685 |
| 7,717,189 B2 * | 5/2010 | Shoup et al. | ................... | 172/456 |

(Continued)

OTHER PUBLICATIONS

Illustrations of Applicant's prior art drive system, 3 pages.

*Primary Examiner* — Joseph Dillon, Jr.
(74) *Attorney, Agent, or Firm* — Renner, Otto, Boisselle & Sklar, LLP

(57) ABSTRACT

An agricultural equipment drive system comprises a main drive shaft connectable to a power source, a first gear box, a second gear box and a second drive shaft. The first gear box has a first gear box input connected to the main drive shaft and a first gear box output at a first angle to the first gear box input. The second gear box has a second gear box input connected to the first gear box output and a second gear box output at a second angle to the second gear box input. The second drive shaft connects the first gear box output to the second gear box input.

15 Claims, 4 Drawing Sheets

(56) References Cited

U.S. PATENT DOCUMENTS

| | | | |
|---|---|---|---|
| 7,766,155 B2* | 8/2010 | Dumenil | 198/468.4 |
| 7,959,697 B2* | 6/2011 | Francis | 55/385.1 |
| 8,062,136 B2* | 11/2011 | Van Den Engel | 464/41 |
| 2002/0020084 A1* | 2/2002 | McClure | 37/357 |
| 2003/0060320 A1* | 3/2003 | Woodcock | 475/230 |
| 2004/0014510 A1* | 1/2004 | Schroeder et al. | 460/2 |
| 2004/0060271 A1* | 4/2004 | Ameye | 56/10.8 |
| 2004/0224812 A1* | 11/2004 | Tweet et al. | 475/231 |
| 2004/0231309 A1* | 11/2004 | Rickert et al. | 56/119 |
| 2005/0034548 A1* | 2/2005 | Bolling et al. | 74/84 S |
| 2006/0090444 A1* | 5/2006 | Ameye | 56/51 |
| 2006/0285947 A1* | 12/2006 | Hansl et al. | 414/277 |
| 2007/0084361 A1* | 4/2007 | Dumenil | 101/40.1 |
| 2007/0209457 A1* | 9/2007 | Irikura et al. | 74/15.8 |
| 2008/0257573 A1* | 10/2008 | Shoup et al. | 172/48 |
| 2010/0223928 A1* | 9/2010 | Roppelt | 60/698 |
| 2012/0145501 A1* | 6/2012 | Blanchard | 192/3.54 |
| 2013/0000268 A1* | 1/2013 | Arnold et al. | 56/367 |
| 2013/0270064 A1* | 10/2013 | Eberhard | 198/358 |

* cited by examiner

US 8,911,182 B2

AGRICULTURAL EQUIPMENT DRIVE SYSTEM

FIELD

This application relates to a drive system for agricultural equipment, such as a grain vacuum.

BACKGROUND

Various types of agricultural equipment are connected to a tractor for use. The tractor can be used to move the equipment. The tractor can also be used to provide power to operate the equipment. A power take-off from the tractor may be connected through a drive system to the equipment.

An example of such agricultural equipment is a grain vacuum. In some grain vacuums, the drive system includes an elongated drive shaft that is adapted to be coupled to the power take-off from the tractor. The drive shaft is coupled along its length to drive various elements of the grain vacuum. For example, the drive shaft may first extend through the hub of a belt drive pulley to rotate the pulley as part of a drive for a fan. The drive shaft may end at a right angle gear box which is coupled to a chain drive which drives an auger which transports grain in the grain vacuum.

Spacers, such as shims, may be used to align the drive shaft to the right angle gear box.

SUMMARY

According to one aspect of embodiments, there is provided an agricultural equipment drive system comprising: a main drive shaft connectable to a power source; a first gear box having a first gear box input connected to the main drive shaft and a first gear box output at a first angle to the first gear box input; at least one second gear box having a second gear box input connected to the first gear output and a second gear box output at a second angle to the second gear box input; and a second drive shaft; wherein the second drive shaft connects the first gear box output to the second gear box input.

In some embodiments, the second drive shaft is bendable.

In some embodiments, the bendable drive shaft comprises a universal joint.

In some embodiments, the second gear box output is at an angle of about 90 degrees to the first gear box input.

In some embodiments, the first angle is about 135 degrees and the second angle is about 45 degrees in a direction opposite to the first angle.

In some embodiments, the first gear box and the second gear box are substantially identical.

In some embodiments, the drive system includes a grain conveyor.

In some embodiments, the grain conveyor comprises a grain auger.

In some embodiments, the second drive shaft comprises a disconnect adapted to disconnect the first gear box from the second gear box if the load exceeds a predetermined limit.

In some embodiments, the first gear box further comprises a second output.

In some embodiments, the second output is substantially in line with the first gear box input.

In some embodiments, the first gear box and the second gear box are substantially identical but oppositely connected wherein the second gear box input is equivalent to the second output and the second gear box output is equivalent to the first gear box output.

In some embodiments, the second output is connectable to a fan drive.

In some embodiments, the fan drive comprises at least one of a belt drive and a fan gear box.

In some embodiments, a substantially horizontal fan is connected to a fan gear box output.

In some embodiments, the drive system includes a grain conveyor wherein the fan is above the grain conveyor.

According to another aspect of embodiments, a grain vacuum drive system comprises: a drive shaft connectable to a power source; a first gear box having an first gear box input connected to the drive shaft, a first gear box output and a second gear box output at a different angle from the first gear box output; the first gear box output being connectable to a fan drive and the second gear box output being connectable to a conveyor drive.

In some embodiments, a second gear box is connected to the first gear box output.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying drawings, in which.

DETAILED DESCRIPTION

Figure 1:
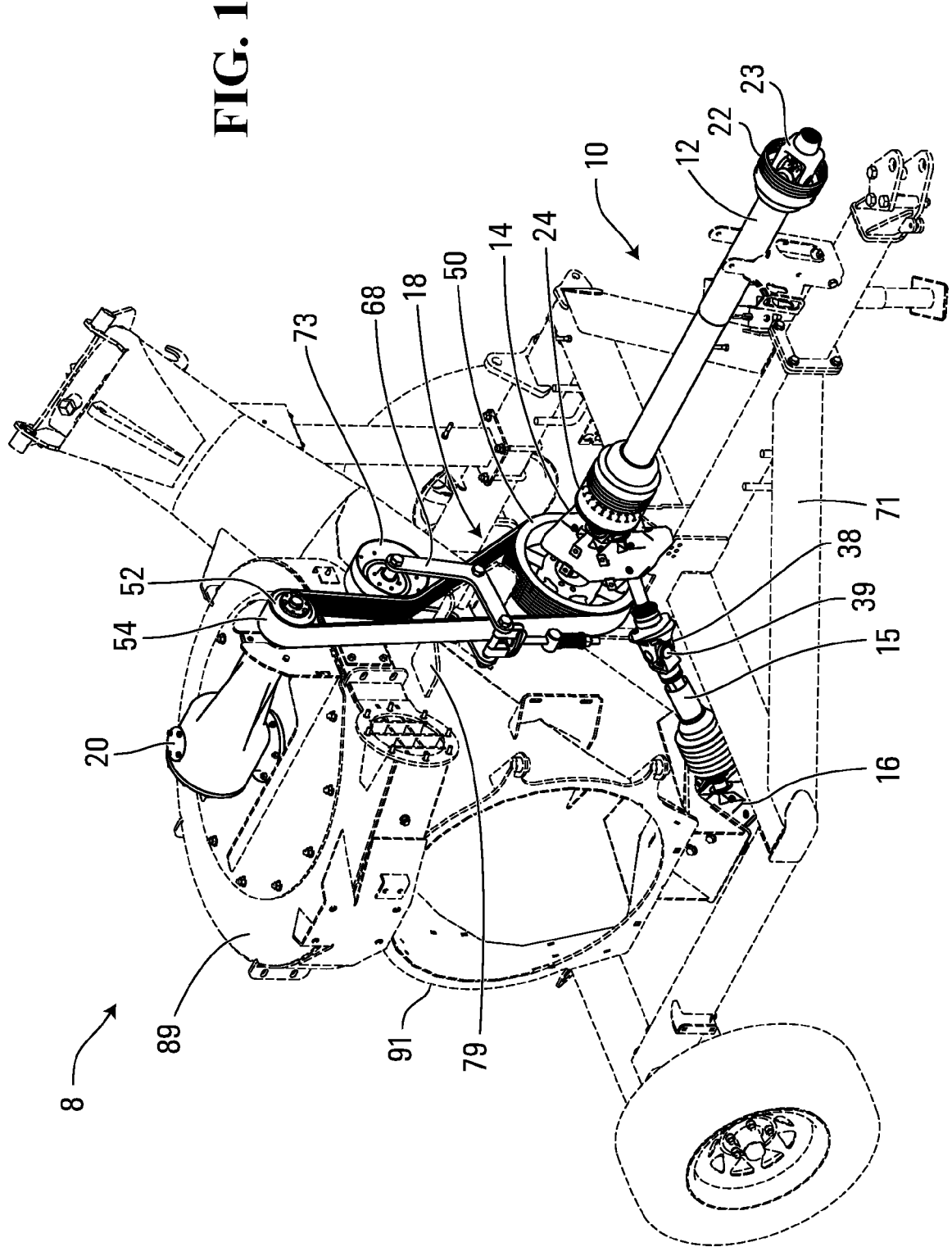
FIG. 1 is a perspective view of a drive system according to an embodiment.
Figure 2:
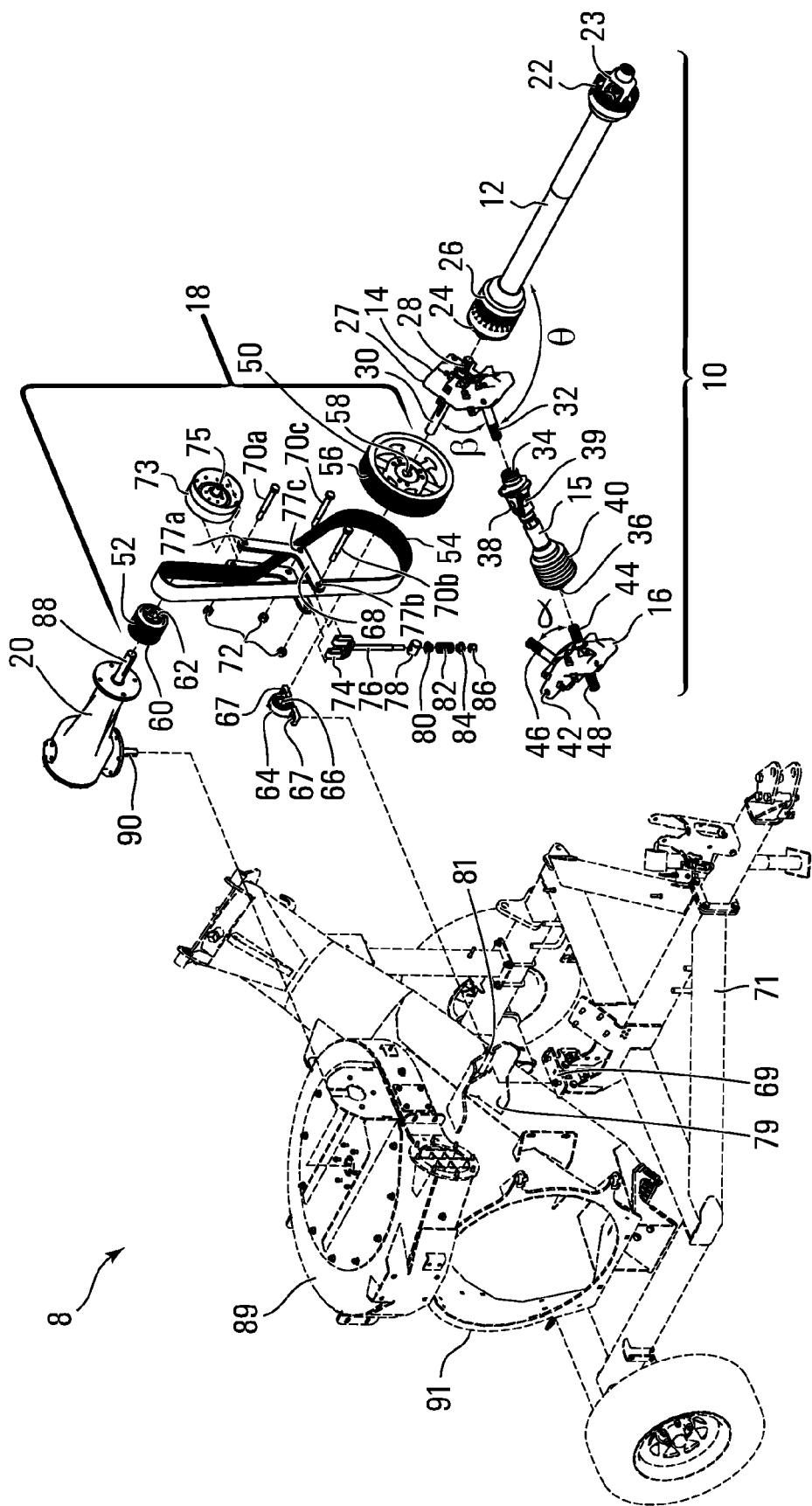
FIG. 2 is an exploded perspective view of the drive system of FIG. 1.
Figure 3:
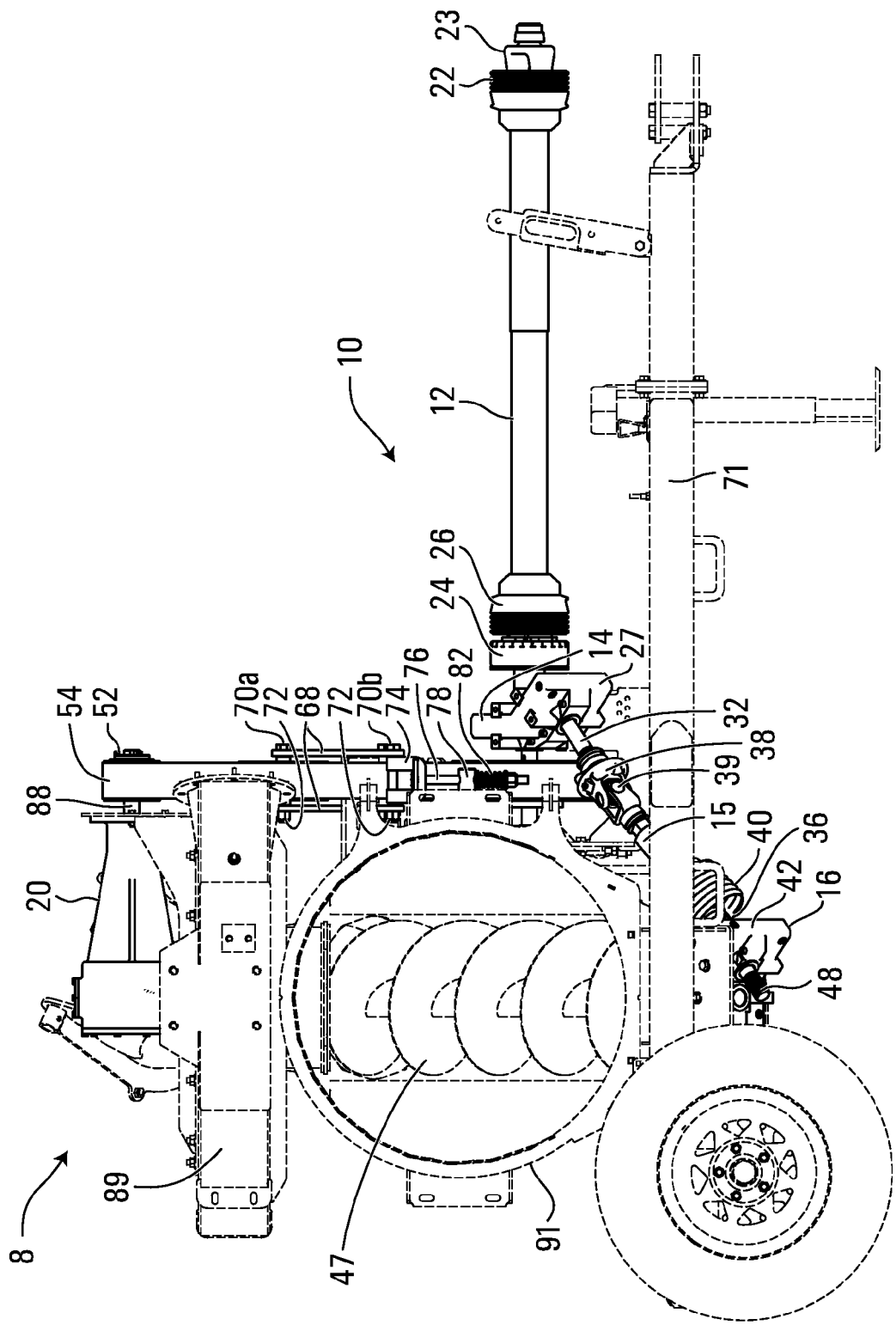
FIG. 3 is a side view of the drive system of FIG. 1.

The embodiment depicted in FIGS. 1 to 3 provides a compact drive system for an agricultural machine such as a grain vacuum. This drive system when used with a grain vacuum employs to angled gear boxes to provide power to drive the auger and fan of the grain vacuum.

Turning to the embodiment in detail, FIGS. 1 to 3 show, respectively, a perspective view, an exploded perspective view and a side view of a grain vacuum 8 which incorporates a drive system 10. The main components of the drive system 10 include a main drive shaft 12, a fan/auger gear box 14, an auger drive shaft 15, an auger gear box 16, a belt drive 18 and a fan gear box 20. The elements of the drive system 10 will be described from the connection of the main drive shaft 12 to the power take off from the tractor outwards as best seen in FIG. 2.

The main drive shaft 12 in this embodiment is a tubular shaft which has a drive shaft tractor end 22 and an opposite main drive shaft gear box end 24. The main drive shaft 12 may have other cross-sectional shapes. The drive shaft tractor end 22 of the present embodiment is adapted to be connected to a source of input power such as a power take off from a tractor to supply power to the drive system 10. Various known couplings for connecting the drive shaft tractor end 22 to the tractor power take off may be utilized. In the present embodiment, the drive shaft tractor end 22 includes a universal joint connector 23. The universal joint connector 23 includes a universal joint to enable the main drive shaft 12 to bend in multiple directions. The connection of the main drive shaft 12 to the tractor may be made without perfect axial alignment of the main drive shaft 12 with the tractor power take off output because the main drive shaft 12 can bend.

At the opposite end of the main drive shaft 12 of the present embodiment is the main drive shaft gear box end 24. Just prior to the main drive shaft gear box end 24, along the main drive shaft 12 in this embodiment, is an overrunning clutch 26. The overrunning clutch 26 is a device that, when the power is disconnected, allows the agricultural machine to free wheel down to a stopped condition. The overrunning clutch 26 may take a form known in the art. The overrunning clutch 26 may be omitted.

The main drive shaft gear box end 24 of the main drive shaft 12 is adapted to be connected to an input of the fan/auger gear box 14. For example, the main drive shaft gear box end 24 may have an internal bore with internally directed protrusions and/or recesses around its circumference.

The next component of the grain vacuum drive system 10 is the fan/auger gear box 14. The fan/auger gear box 14 of the present embodiment has a single input and two outputs. In particular, the fan/auger gear box 14 has a fan/auger gear box body 27, a main drive shaft input 28, a belt drive output 30 and a gear box to gear box output 32. In this embodiment, the main drive shaft input 28 is a short tubular shaft which is linearly aligned with the longitudinal axis of the main drive shaft 12 at the gear box end 24. The main drive shaft input 28 in this embodiment includes protrusions and/or recesses which are sized to mate with the protrusions and/or recesses on the inner circumference of the bore in the main drive shaft gear box end 24. Other complimentary shapes or coupling may be used to connect the main drive shaft 12 to the fan/auger gear box 14.

The fan/auger gear box 14 has the belt drive output 30 which may be, as in this example, linearly aligned with the main drive shaft input 28 on the opposite side of the fan/auger gear box 14. In this embodiment, the belt drive output 30 is a shaft with a substantially smooth tubular outer shape which may, for example, have a slot defined along part of its length for mating with a hub which it fits into as will be described further below. The belt drive output 30 may be angled in other directions or take another shape or form, for example, the shape may be the same as that of the main drive shaft input 28.

The fan/auger gear box 14 of this embodiment also includes a gear box to gear box output 32. In this embodiment, the gear box to gear box output 32 is angled at an angle β of approximately 45 degrees to the belt drive output 30 and at an angle θ of approximately 135 degrees to the main drive shaft input 28. Other relative angles of orientation are also possible. In this embodiment, the gear box to gear box output 32 may have a tubular shape with one or more radial outward protrusions and/or recesses at the end for mating with the auger drive shaft 15.

In this embodiment, the fan/auger gear box body 27 includes interior gears which split the main drive shaft input 28 into the two outputs namely the belt drive output 30 and the gear box to gear box output 32. These internal gears also alter the direction of the gear box to gear box output 32 to be at an angle, for example, at the angle β of 45 degrees to the belt drive output 30. Finally, the internal gears can change the gear ratio. For example, the ratio from the main drive shaft input 28 to the gear box to gear box output 32 may be approximately 1.35 to 1. The rotation is thereby decreased from 1000 RPM to 740 RPM. In contrast, the ratio from the main drive shaft input 28 to the belt drive output 30 may be approximately 1 to 1. In other words, there may be no gears between the main drive shaft input 28 and the belt drive output 30. The main drive shaft input 28 and the belt drive output 30 may together comprise opposite ends straight through single shaft. Alternatively, they may be two separate shafts directly connected or connected by gears with or without a gear ratio.

The fan/auger gear box 14 thus splits the drive system 10 into two portions. One portion, the conveyor drive, connected to the gear box to gear box output 32, is for powering an auger 47 (see FIG. 3). The other portion, the fan drive, connected to the belt drive output 30, is for powering the fan 89.

Along the auger connection portion of the drive system 10, there is the auger drive shaft 15. The auger drive shaft 15 may be any shape but is tubular in this example. The auger drive shaft 15 has an auger drive shaft input end 34 and an auger drive shaft output end 36. The auger drive shaft input end 34 may have an internal bore for receiving and coupling to the gear box to gear box output 32 from the fan/auger gear box 14. The internal bore of the auger drive shaft input end 34 may have protrusions/recesses which are shaped to mate with and cooperate with complimentary protrusions/recesses on the gear box to gear box output 32 so that rotation is transmitted from the gear box to gear box output 32 to the auger drive shaft 15. Other means of connection between the fan/auger gear box 14 and the auger drive shaft 15 may also be used such as a quick connector.

The auger drive shaft 15 may include a universal joint 38 at an intermediate position along its length. The universal joint 38 allows the auger drive shaft 15 to bend about two axes so that the auger drive shaft input end 34 and the auger drive shaft output end 36 are not necessarily aligned along the length of the auger drive shaft 15. The universal joint 38 may also include a shear coupling 39 such as a shear pin. The shear coupling 39 is a disconnect intended to decouple the power input from the power output if the load exceeds a predetermined limit. The shear coupling will break or disengage if the torque becomes too great. This will essentially break the auger drive shaft 15 into two pieces and therefore sever the connection between the tractor and the auger 47. The shear coupling 39 may be eliminated or be replaced with another mechanism such as a friction clutch. The universal joint 38 may be replaced with another jointed or flexible connection or may be eliminated and the auger drive shaft may be rigid. The universal joint 38 can compensate for imperfect alignment between the auger 47 and other parts of the drive system 10.

In this embodiment, the auger drive shaft output end 36 may have a shield 40 which encircles and shields the auger drive shaft output end 36 from debris or damage and the user from accidental injury. The auger drive shaft output end 36 of this embodiment also includes an internal bore with protrusions and/or recesses for connection to the auger gear box 16.

In other embodiments, the fan/auger gear box 14 may be directly coupled to the auger gear box 16 without an auger drive shaft 15.

The auger gear box 16 includes an auger gear box body 42, an auger drive input 44 and two outputs, namely an auger drive output 46 and an unused output 48. The auger gear box 16 is configured the same in this embodiment as the fan/auger gear box 14 and may be substantially or completely identical to the fan/auger gear box 14. However, the orientation of the gear box is different. What is the main drive shaft input 28 in the fan/auger gear box 14, is the unused output 48 in the auger gear box 16. What is the belt drive output 30 in the fan/auger gear box 14, is the auger drive input 44 of the auger gear box 16. What is the gear box to gear box output 32 in the fan/auger gear box 14, is the auger drive output 46 in the auger gear box 16. The gear ratio may be identical to that of the fan/auger gear box 14. For example, the ratio from the auger drive input 44 to the auger drive output 46 is approximately 1.35 to 1. In other words, the rotation has been further decreased from 740 RPM to 550 RPM.

In this embodiment, the auger drive output 46 is at an angle α of approximately 45 degrees to the auger drive input 44 which corresponds to the angle β of the fan/auger gear box 14. However, other angles may be used. The angle θ of 135 degrees and the angle α of 45 degrees in the opposite direction combine for an angle of 90 degrees between the main drive shaft 12 and the output 46 to the auger 47. The auger drive output 46 in this embodiment is a short cylindrical shaft with protrusions and/or recesses which are sized and configured to mate with, for example, the auger 47 to rotate the auger 47. In this embodiment, the unused output 48 is not connected to anything and may be covered with a safety guard. In other embodiments, the output 48 could be used to provide power to other agricultural machinery depending on the configuration of the agricultural device being powered by the drive system 10. The unused output 48 may also be eliminated.

Figure 4A:
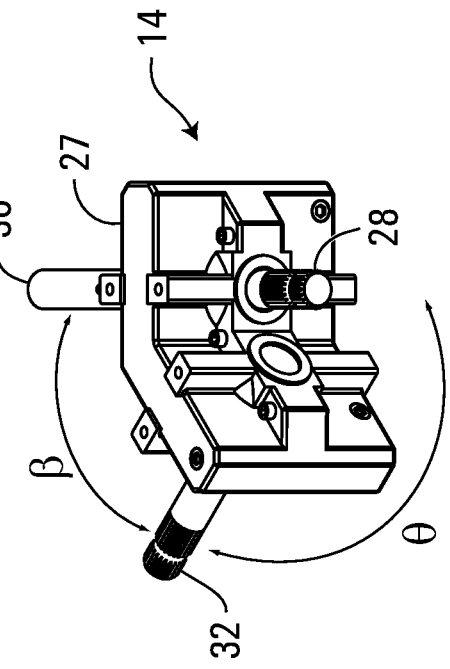
FIG. 4A is a perspective view of a fan/auger gear box for the drive system of FIG. 1.
Figure 4B:
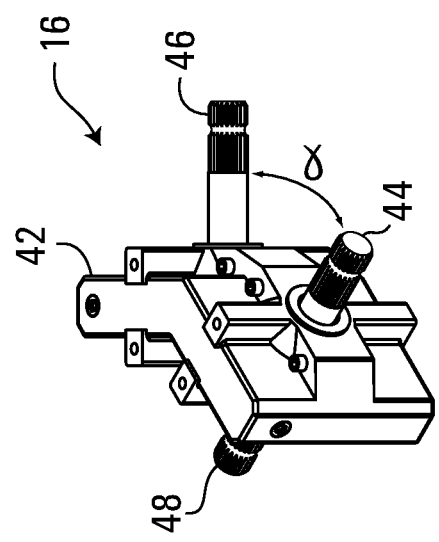
FIG. 4B is a perspective view of an auger gear box for the drive system of FIG. 1.

The fan/auger gear box 14 and the auger gear box 16 are shown enlarged in FIG. 4A and FIG. 4B. It will be appreciated that, in this embodiment, the shape of the shaft of the output 30 from the fan/auger gear box 14 is different from the shape of the shaft of the input 46 to the auger gear box 16 making the gear boxes substantially, but not completely identical.

The two gear boxes 14 and 16 together gear down the output of the tractor of approximately 1000 RPM to an output of approximately 540 RPM to provide the proper rotational speed for the auger 47. The internal gears of the auger gear box 16 provide the required gear ratio and splitting from one output to two outputs and the angles as does the fan/auger gear box 14.

The portion of the drive shaft system 10 which drives the auger 47 may thus use two gear boxes, without any belt or chain drives. The overall number of drive components is reduced. The use of two identical gear boxes may reduce the number of unique parts that need to be made. The angled gear boxes may allow a compact configuration in that a long main drive shaft may be replaced with a shorter main drive shaft 12 and an angled auger drive shaft 15. The overall length of the drive system from the tractor to the auger 47 may be shortened. The presence of universal joints in both the main drive shaft 12 and the auger drive shaft 15 can be used for alignment of connections to avoid the use of shims or other such alignment means.

This completes the portion of the drive system 10 which is connected to the gear box to gear box output 32 from the fan/auger gear box 14.

Turning now to the portion of the drive system 10 that is connected to the belt drive output 30 of the fan/auger gear box 14, there is a belt drive 18 (see FIG. 2). The belt drive 18 includes a drive pulley 50, a driven pulley 52, and a belt 54. In this embodiment, the drive pulley 50 has an outer surface 56 and a central inner bore 58. The width of the outer surface 56 is sized to match the width of the belt 54 and has a surface which cooperates with the belt 54 to turn the belt 54 when the drive pulley 50 is rotated. In this embodiment, the outer surface 56 is connected to an inner hub by spokes but the configuration of the drive pulley may be varied. For example, the drive pulley 50 may be a more solid wheel.

The inner bore 58 is sized to mate with the belt drive output 30 from the fan/auger gear box 14 such that rotation of the belt drive output 30 causes rotation of the drive pulley 50. This may be provided by a cooperating key and slot, cooperating protrusions and recesses or other couplings such as a quick connection.

In this embodiment, the driven pulley 52 has a smaller diameter than the drive pulley 50. The driven pulley 52 also has an outer circumference 60 and an inner bore 62. As with the drive pulley 50, the driven pulley 52 has a width and surface finish to cooperate with the belt 54. In this embodiment, the driven pulley 52 is of a smaller diameter than the drive pulley 50 so that the gear ratio between the drive pulley 50 and the driven pulley 52 is 1:2.64 in this embodiment. In other embodiments, other relative diameters and consequent ratios may be used depending on the requirements of the fan or other equipment being powered.

The belt drive 18 of this example also includes a mount 64. The mount 64 has a central bore 66 and side flanges 67. The side flanges 67 are used to fasten the mount 64 to a plate 69 (see FIG. 2) on a support frame 71 of the grain vacuum 8. The central bore 66 is sized to receive an end of the belt drive output 30 after it passes through the inner bore 58 of the drive pulley 50. The mount 64 therefore provides a second point of support for the linear drive assembly which includes the main drive shaft 12 and the main drive shaft input 28, and the belt drive output 30.

In order to help maintain the belt 54 in contact with the drive pulley 50 and the driven pulley 52, the belt drive 18 of this embodiment also includes a tension system. The tension system includes a tensioner wheel 73 and two L-brackets 68 in this embodiment. The tensioner wheel 73 has a central hole 75 aligned with holes 77a in the two L-brackets 68 for receiving a bolt 70a. Two other bolts 70b and 70c go through holes 77b and 77c in the opposite end and the corner respectively of the L-brackets 68 and are held in place by nuts 72. The bolt 70c through the holes 77c of the elbow of the L-brackets 68 passes through the centre of the belt 54 and through a hole 81 in a support bracket 79 (see FIG. 2) mounted on the grain vacuum 8. The tensioner wheel 73 is thus supported by the support bracket 79 and rests against the outside of the belt 54 to provide pressure to maintain tension on the belt 54.

The tensioner wheel 73 is supported by a spring loaded mount system which is connected through the holes 77b to the L-brackets 68. the spring loaded mount system includes a U-bracket 74, a bolt 76, a spacer 78, spring caps 80 and 84, a spring 82 and a nut 86. The U-bracket 74 has two holes through which the bolt 70b is used to fasten the U-bracket 74 by the holes 77b to the lower end of the L-brackets 68 outside the belt 54 on the opposite side from the tensioner wheel 73. Descending downward from the U-bracket 74 is the bolt 76. The bolt 76 passes through a spacer 78, a spring cap 80, a spring 82, a second spring cap 84 and a nut 86. The top side of the spacer 78 is mounted beneath a plate (not shown) that is attached to an extension of the support frame 71. Tightening the nut 86 compresses the spring 82 and rotates the L-brackets 68 and the tensioner wheel 73 about the hole 81 in the support bracket 79, thus providing pressure of the tensioner wheel 73 against the belt 54 to maintain tension on the belt 54.

Figure 5:
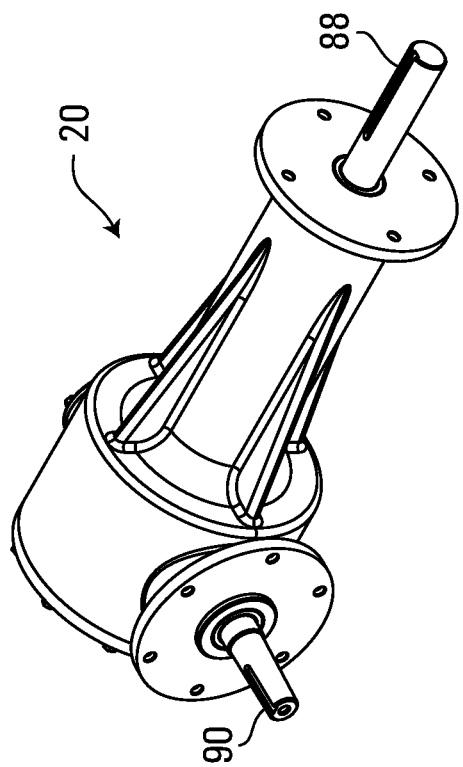
FIG. 5 is a perspective view of a fan gear box for the drive system of FIG. 1.

Returning to the driven pulley 52, the inner bore 62 of the driven pulley in this embodiment is sized to receive a fan gear box input shaft 88 of the fan gear box 20. The fan gear box input shaft 88 of this embodiment is cylindrical and includes a recess which mates with a protrusion in the inner bore 62 of the driven pulley 52 so that they engage and cause rotation of the driven pulley 52 to be transferred to the fan gear box input shaft 88. The fan gear box 20 also has an output shaft 90. In this embodiment, the output shaft 90 is perpendicular to the fan gear box input shaft 88 and is oriented downwardly to mate with the fan 89 which is horizontally oriented. The fan gear box 20 is shown enlarged in FIG. 5. The fan gear box 20 of this embodiment is a right angle gear box with a gear ratio of 1:1.85 which provides an output of approximately 4900

RPM. Other fan gear box orientations may be used. For example, the fan gear box may be a straight through gear box if the fan is vertical. The fan gear box may be eliminated if a vertical fan is connected directly to the belt drive output 30 with an appropriate gear ratio.

Although a particular vertical belt drive 18 is described in this embodiment, other belt drive configurations may be used. The belt drive 18 may also be replaced with a gear box or eliminated if the fan gear box 20 is aligned with and directly connected with the fan/auger gear box 14 or directly with the fan 89 or if the fan 89 is omitted.

Thus in this embodiment, the belt drive 18 is vertically oriented and the fan 89 is horizontally oriented and the auger 47 is upwardly angled.

In operation, the power take off from the tractor rotates the main drive shaft 12. The main drive shaft 12 in turn rotates the main drive shaft input 28, this input is transformed by the fan/auger gear box 14 to the two outputs 30 and 32. The gear box to gear box output 32 rotates the auger drive shaft 15 which, in turn, rotates the auger drive input 44. The auger gear box 16 transforms this input to the auger drive output 46 which drives the auger 47 or other equipment. The two 45 degree angle gear boxes of the present embodiment allow for a compact region in which the power is transformed and fed to the auger 47 as can be seen in the side view of FIG. 3. The presence of universal joints in the two shafts 12 and 15 means that no further other alignment system may need to be used.

Turning to the belt drive output 30, the rotation of the belt drive output 30 rotates the drive pulley 50 which in turn rotates the driven pulley 52. The driven pulley 52 in turn rotates the fan gear box input 88. The fan gear box 20 transforms this input which then rotates the fan gear box output 90, which, in turn, rotates the fan 89.

Although this embodiment uses two 45 degree angle gear boxes, it will be understood that other angles of gear boxes may be used. A combined angle of 90 degrees from the gear boxes allows the input power from the tractor to be fed to an auger which is perpendicular to the tractor. Other orientations of augers relative to the tractor may result in other angles.

In this embodiment, the fan is horizontally oriented but it will be appreciative that the fan may be otherwise oriented. Also, the belt drive may be replaced with further gear boxes. Alternatively, the fan gear box may be replaced with a further belt or chain drive, or for example, the fan gear box may be eliminated and a different belt drive used if the fan is vertically oriented. The entire belt drive assembly may be eliminated when the drive system is used to power other equipment.

As best can be seen from FIG. 3 the drive system 10 according to the present embodiment is compact in that it transfers power to the auger and to the fan without having a very long main drive shaft 12.

What has been described is merely illustrative of the application of the principles of the invention. Other arrangements and methods can be implemented by those skilled in the art without departing from the spirit and scope of the present invention.

The invention claimed is:

1. An agricultural equipment drive system comprising:
   a grain conveyor;
   a main drive shaft connectable to a power source;
   a first gear box having a first gear box input connected to the main drive shaft and a first gear box output at a first angle to the first gear box input;
   a second gear box having a second gear box input connected to the first gear output and a second gear box output at a second angle to the second gear box input; and
   a second drive shaft;
   wherein the second drive shaft connects the first gear box output to the second gear box input; and
   wherein the second gearbox output is directly connected to the grain conveyor.

2. The drive system of claim 1 wherein the second drive shaft is bendable.

3. The drive system of claim 2 wherein the second drive shaft comprises a universal joint.

4. The drive system of claim 1 wherein the second gear box output is at an angle of about 90 degrees to the first gear box input.

5. The drive system of claim 1 wherein the first angle is about 135 degrees and the second angle is about 45 degrees in a direction opposite to the first angle.

6. The drive system of claim 1 wherein the first gear box and the second gear box are substantially identical.

7. The drive system of claim 1 wherein the grain conveyor comprises a grain auger.

8. The drive system of claim 1 wherein the second drive shaft comprises a disconnect adapted to disconnect the first gear box from the second gear box if the load exceeds a predetermined limit.

9. The drive system of claim 1 wherein the first gear box further comprises a second output.

10. The drive system of claim 9 wherein the second output is substantially in line with the first gear box input.

11. The drive system of claim 9 wherein the first gear box and the second gear box are substantially identical but oppositely connected wherein the second gear box input is equivalent to the second output and the second gear box output is equivalent to the first gear box output.

12. The drive system of claim 9 wherein the second output is connectable to a fan drive.

13. The drive system of claim 12 wherein the fan drive comprises at least one of a belt drive and a fan gear box.

14. The drive system of claim 13 further comprising a substantially horizontal fan connected to a fan gear box output.

15. The drive system of claim 14 wherein the fan is above the grain conveyor.

* * * * *